United States Patent

Ohta et al.

[11] 4,366,362
[45] Dec. 28, 1982

[54] ALL POSITION TIG WELDING PROCESS

[75] Inventors: Ichiro Ohta; Akio Tejima, both of Yokohama; Masayuki Watando, Yokosuka; Akira Yamaoka, Chigasaki; Kouzi Ishiwata, Yokosuka; Minoru Yamada, Yokohama, all of Japan

[73] Assignee: Ishikawajima-Harima Jukogyo Kabushiki Kaisha, Tokyo, Japan

[21] Appl. No.: 231,141

[22] Filed: Feb. 3, 1981

[30] Foreign Application Priority Data

Mar. 18, 1980 [JP] Japan ................................. 55-34396

[51] Int. Cl.³ ............................................. B23K 9/09
[52] U.S. Cl. ............................... 219/123; 219/130.51; 219/137 PS
[58] Field of Search ............. 219/123, 130.51, 137 PS, 219/137 R

[56] References Cited

U.S. PATENT DOCUMENTS

| 3,274,371 | 9/1966 | Manz et al. | 219/137 R |
| 3,627,974 | 12/1971 | Normando et al. | 219/137 PS |
| 3,777,115 | 12/1973 | Kazlauskas et al. | 219/137 R |
| 3,838,244 | 9/1974 | Petrides et al. | 219/137.71 |
| 4,019,016 | 4/1977 | Friedman et al. | 219/130.51 |

FOREIGN PATENT DOCUMENTS

| 1520019 | 4/1968 | France | 219/130.51 |
| 238044 | 7/1969 | U.S.S.R. | 219/130.51 |

Primary Examiner—C. C. Shaw
Attorney, Agent, or Firm—B. B. Olive

[57] ABSTRACT

In a TIG welding process with controlled welding current pulses, DC current pulses with the frequency set at from tens to hundreds Hz (most preferably from 30 to 300 Hz) are fed to an electrode and current pulses are also fed to a filler wire so that an arc is caused to swing, whereby a large pool of molten metal can be maintained in a positive and stable manner due to the high arc pressure obtained when the welding current pulses at from tens to hundreds Hz is used.

5 Claims, 10 Drawing Figures

ALL POSITION TIG WELDING PROCESS

BACKGROUND OF THE INVENTION

The present invention relates to an all-position TIG (tungsten-inert gas) welding process.

Since excellent qualities of welds are obtained by TIG welding processes, the latter are widely used in welding various pipes in any welding position. In general, TIG welding processes may be divided into low-frequency pulse TIG welding processes which are most commonly practiced and high-frequency pulse TIG welding processes which are reserved for special purposes.

In the case of the low-frequency pulse TIG welding process, the welding current is controlled by the electric current pulses of low frequencies of a few hertz while the welding torch is moved. The weld zone is subjected to repeated melting and solidification and a bead is obtained. Therefore, the low-frequency pulse TIG welding process is best adapted in welding in any position. In addition, the low-frequency pulse TIG welding machines are simple in construction and are highly efficient in operation when used at field sites. However, the low-frequency pulse TIG welding has an inherent disadvantage in welding efficiency; that is, the metal deposition rate is low. For instance, in the case of a vertical downward welding position, which is most commonly practiced, the metal deposition rate is less than 8 g/min (with heat input of 7,500 Joule/cm). As a result, the number of passes must be increased so that the set-up time required for rewinding the welding cables and the hoses for inert gas is increased and subsequently the welding must be interrupted intermittently for a relatively long period. Thus, the productivity is low.

In the high-frequency pulse TIG welding processes, high-frequency pulse arcs of 2,000 to 25,000 Hz are used. In synchronism with the mechanical weaving of a welding torch, the output of the high-frequency current is controlled, whereby the pipes can be welded in all positions. Since an arc stream which is small in cross section and well stabilized can be obtained, satisfactory penetration can be achieved even when grooves have narrow widths, and a large molten metal pool can be maintained as compared with the low-frequency pulse TIG welding processes. However, the high-frequency pulse TIG welding processes have also a disadvantage in that when the distance between the electric power source and the welding torch exceeds a few meters, the high-frequency components are suddenly decreased due to inductance of the welding cable. As a result, the desired welding effects peculiar to the high-frequency pulse TIG welding processes cannot be attained at all under common or general welding set-ups. As a result, the efficiency of all position welding is adversely affected. For instance, in the case of the vertical downward welding, the metal deposition rate is on the order of 15 g/min (with the heat input of 15,000 Joule/cm).

The efficiency of the all position welding is greatly influenced by how well a molten metal pool is maintained. Basically, in order to improve the metal deposition rate and subsequently the welding efficiency, a large molten metal pool must be maintained. However, the volume of the molten metal pool is limited because of the force of gravity in the case of the all position welding. The molten metal pool is most difficult to be maintained especially in the vertical downward welding position. This will be discussed with reference to FIG. 1. In the vertical welding position, the molten metal pool 1 has tendency to flow downward because of the force of gravity, but the surface tension of molten metal maintains the pool 1 to some extent. The volume of the molten metal pool 1 which is maintained or sustained by the surface tension of molten metal is of course limited. In order to increase the volume of the pool 1, an additional force must be exerted to it. In the case of the vertical downward welding, when the contact angle $\theta$ exceeds a certain limit, to so-called cold lap occurs with the resultant poor welds. This is the reason why the vertical downward welding has a low welding rate. In FIG. 1, reference numeral 2 denotes a base metal; 3, a torch; and 4, an arc.

As described above, the low-frequency pulse TIG welding processes have an inherent disadvantage in that the weld deposition rate is low. In addition, maintainability of a molten metal pool by an arc is low. As a result, when the low-frequency pulse TIG welding processes are used in all position welding, the welding efficiency further drops as compared with other welding processes such as MIG welding processes. The high-frequency pulse TIG welding processes are superior in metal deposition rate and maintainability of a molten metal pool to the low-frequency pulse TIG welding processes, but has a disadvantage in that the applications in the field-sites are difficult as described elsewhere.

There are welding processes which may be called "intermediate-frequency pulse TIG welding" because they use the frequencies intermediate the low and high frequencies used in TIG welding processes described above, but they have not been practiced. It is well known in the art that with the welding current pulses at intermediate frequencies, high arc pressures can be obtained; but the intermediate-frequency pulse TIG welding processes have a disadvantage in that the surface of the molten metal pool immediately below the arc is depressed because of the high pressure so that the arc is surrounded with the molten metal which rises high in level. As a result, bead formation is unsatisfactory.

In view of the above, the present invention has for its object to provide a TIG welding process in which current pulses at intermediate frequencies are used to obtain high arc pressures so that welds with high qualities comparable with those obtained by the high- or low-frequency pulse TIG welding processes can be obtained and the welding efficiency or rate can be remarkably improved.

The present invention will become more apparent from the following description of a preferred embodiment thereof taken in conjunction with the accompanying drawings.

DETAILED DESCRIPTION OF THE PREFERRED EMBODIMENT

Figure 2:
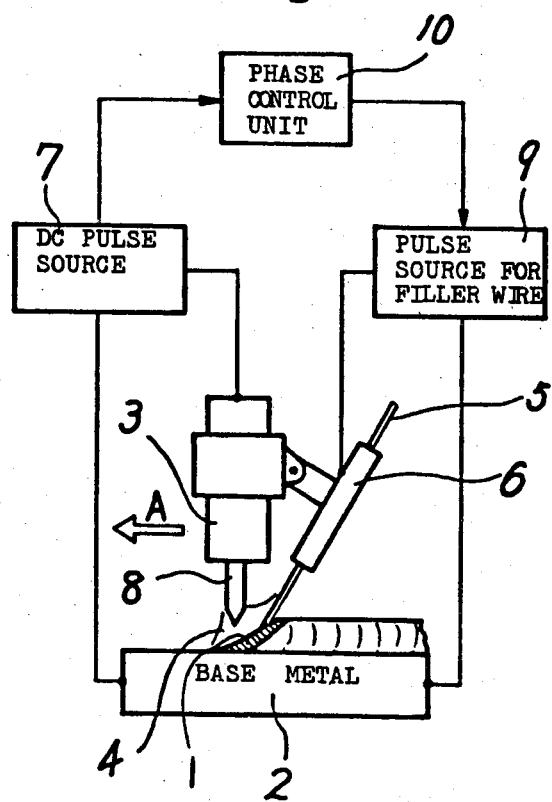
FIG. 2 is a schematic view showing the equipment used in the present invention.

In FIG. 2, reference numeral 3 denotes a welding torch; 8, a tungsten electrode; 2, a base metal; 5, a filler wire; and 6, a wire holder attached to the torch 3 backwardly of the direction A of the welding in such a way that the filler wire 5 may be held as much in parallel with the tungsten electrode 8 as possible.

A DC pulse source 7 is connected to the tungsten electrode 8 and the base metal 2, and a pulse source 9 for filler wire is connected to the filler wire 5 and the base metal 2. The pulse sources 7 and 9 are interconnected through a phase control unit 10 which locks the pulses generated by the power sources 7 and 9 in predetermined phase relationship.

The DC current pulses (main current) at the frequency of from tens to hundreds Hz flows from the DC pulse source 7 through the tungsten electrode and base metal 2 8 so that the arc 4 is obtained between them. At the start of the welding, the phase control unit 10 so controls the pulse source 9 that the latter transmits the sub-current pulses in synchronous phase relationship with the main current pulses to the filler wire 5. The tip of the filler wire 5 is fed into the high-temperature plasma jet in the welding arc so that the filler wire 5 is quickly melted into the molten metal pool 1.

Figure 3A:
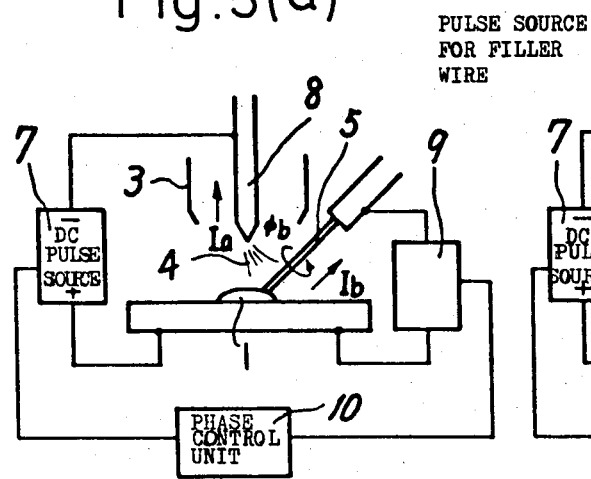
FIGS. 3(a) and (b) are views used for the explanation of swinging of an arc.
Figure 3B:
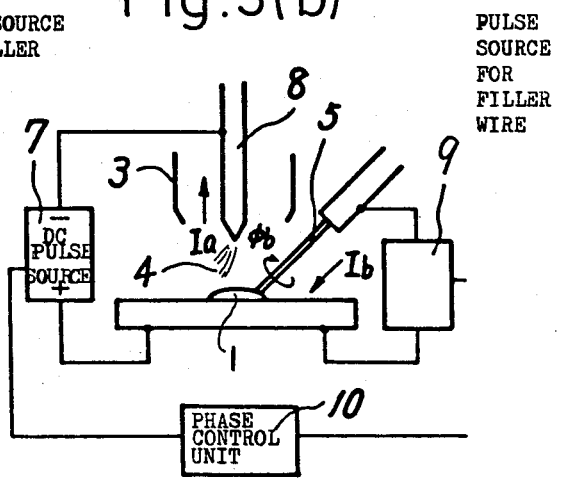
Figure 4A:
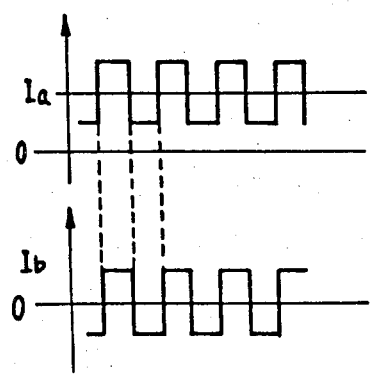
FIGS. 4(a) and (b) show waveforms of the main pulses and the sub-pulses.
Figure 4B:
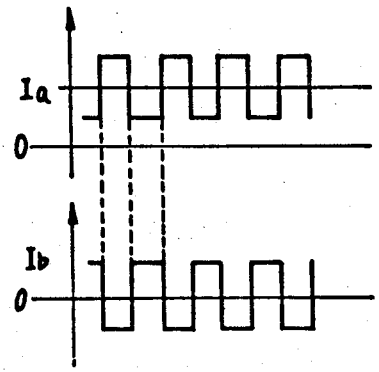

The movement of the arc 4 under these conditions will be discussed below. When, as shown in FIG. 4(a), the main current $I_a$ and the sub-current $I_b$ are of the same frequency and in phase, the magnetic field is produced around the filler wire 5 in the direction indicated by $\phi_b$ as shown in FIG. 3(a). The established magnetic filed $\phi_b$ so interacts with the arc current that the arc is attracted toward the filler wire 5. That is, the arc is caused to swing toward the filler wire or rod 5. On the other hand, when, as shown at FIG. 4(b), the main current $I_a$ and the sub-current $I_b$ are of the same frequency and out of phase, the arc is caused to swing away from the filler wire 5 as shown in FIG. 3(b). Thus when the polarity of the sub-current $I_b$ is varied in time, the arc is caused to swing toward or away from the filler wire 5 about the tungsten electrode 8 at a frequency corresponding to the frequency of the sub-current or pulse $I_b$.

However, unless the phase relationship between the main current $I_a$ and the sub-current $I_b$ is locked, the swinging motion of the arc 4 is disturbed at random so that a sound weld cannot be obtained.

Therefore the present invention uses the phase control unit 10 so that the main current $I_a$ and the sub-current $I_b$ can be locked in predetermined phase relationship so that the uniform swinging motion of the arc 4 can be obtained.

Since the arc 4 is swung regularly uniformly over the molten metal pool as described above and bacause the intermediate-frequency pulse TIG welding process establishes a high arc pressure, the maintainability of the molten metal pool can be considerably increased as compared with the high- or low-frequency pulse TIG welding processes.

According to the present invention, the main current $I_a$ and the sub-current $I_b$ are controlled in synchronous phase between 0° and 180° as shown in FIG. 4(a). When the main current $I_a$ and the sub-current $I_b$ are in phase as shown in FIG. 4(a), the arc 4 is attracted toward the filler wire 5, but when they are out of phase by 180° as shown in FIG. 4(b), the arc is attracted away from the filler wire 5. As a result, the uniform swinging motion of the arc is maintained, and the molten metal pool is also stabilized. In addition, the swinging motion of the arc can be maintained even by the low sub-current $I_b$. Thus, the arc can be controlled in an optimum manner depending upon various welding conditions such as the main current $I_a$, the amount of filler wires used and so on.

In FIGS. 4(a) and 4(b), the sub-current $I_b$ is shown as having a rectangular waveshape, but it is to be understood that it may have any other suitable waveshape such as a sinusoidal waveshape.

Figure 5:
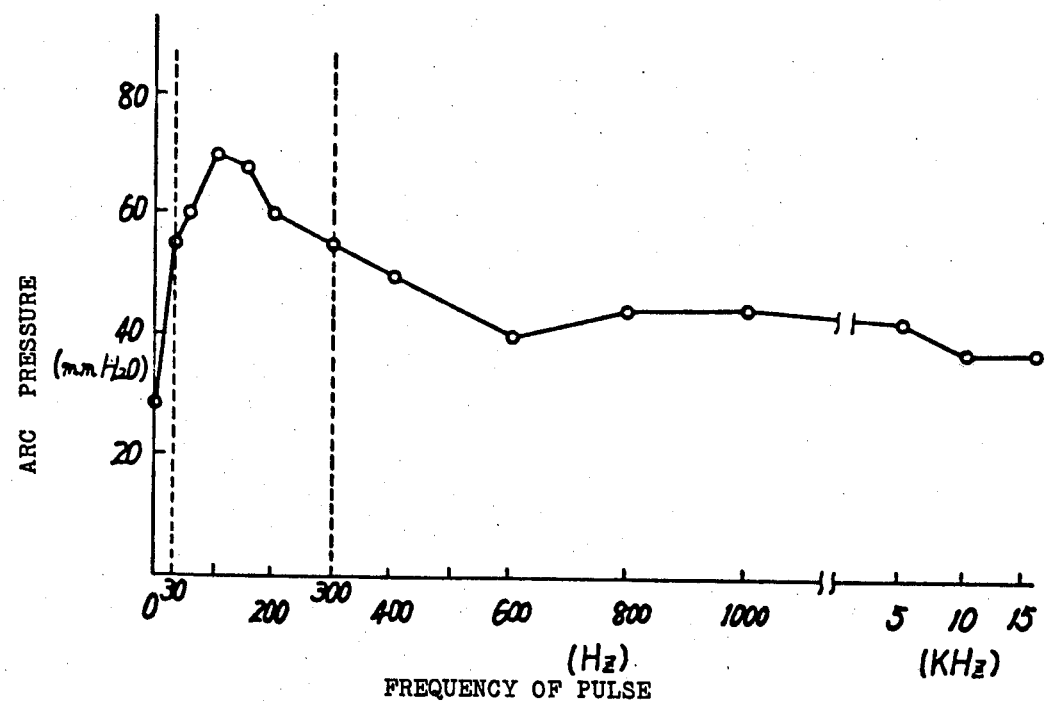
FIG. 5 shows the relationship between the pulse frequency and the arc pressure.

FIG. 5 shows the relationship between the arc pressure and the frequency of welding current pulses. It is seen that the arc pressure reaches a peak at a frequency between 30 and 500 Hz (intermediate frequencies). As compared with the arc pressures obtained by a constant current or high-frequency current pulses, this arc pressure is considerably high. Therefore when the current frequency is between 30 and 500 Hz, a high-volume molten metal pool can be maintained in a stable manner. When the frequency is near 30 Hz, intermittent variations in heat input to the arc and the arc pressure are pronounced and the rates at which the base metal and the filler wire are melted drop so that desired welding rates cannot be obtained. On the other hand, when the frequency selected is close to the upper limit, i.e., 500 Hz, the arc is "hardened" so that the magnetic control on the arc movement cannot be attained. In view of the above, an optimum frequency band ranges from 30 to 300 Hz.

According to the present invention, unlike the high- or low-frequency pulse TIG welding processes, the arc is not concentrated at one point over the surface of the molten metal pool, but is caused to swing three-dimensionally in synchronism with the frequency of the pulse from 30 to 300 Hz. As a result, the electromagnetic pressure waves are generated and propagated radially over the molten metal pool. This dynamic arc column is uniformly swung in the direction of the welding and in the opposite direction (to left and to right in FIGS. 3(a), 3(b)) by the synchronized sub-current or pulse. In addition, the phase is controlled as described elsewhere. As a result, even when the downward force is exerting on the molten metal pool as in the case of the vertical upward or downward welding, the pool can be maintained in a stable manner so that the welding efficiency or deposition rate can be remarkably improved.

Figure 6:
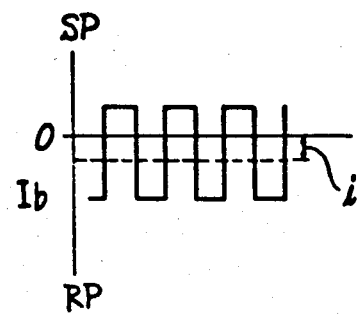
FIGS. 6 and 7 are views used for the explanation of the bias control on sub-pulses.
Figure 7:
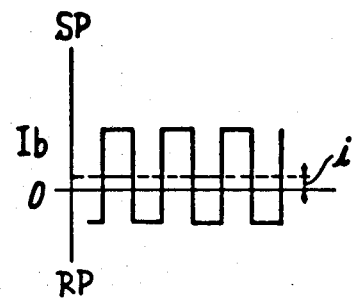

According to the present invention, in order to maintain a molten metal pool of a large volume and subsequently to improve the welding efficiency or weld deposition rate, a bias current i is superimposed on the sub-current $I_b$ passing through the filler wire 5 as shown in FIG. 6 or 7. A negative or positive bias current i may be superimposed through a bias current control means (not shown) so that, without changing the amplitude of the swinging motion of the arc, the forward or backward swing is controlled depending upon the welding position. As a result, the molten metal pool can be maintained in a more stable manner.

FIG. 6 shows the sub-current $I_b$ superimposed with the positive bias current i while FIG. 7 shows the sub-current $I_b$ superimposed with the negative bias current i.

The polarity of the bias current i is changed depending upon the vertical downward or upward welding position while the magnitude of the bias current i is selected suitably and may be zero depending upon the welding position so that a desired molten metal pool can be maintained and a predetermined heat input to the filler wire, that is, a predetermined effective value can be maintained.

Figure 1:
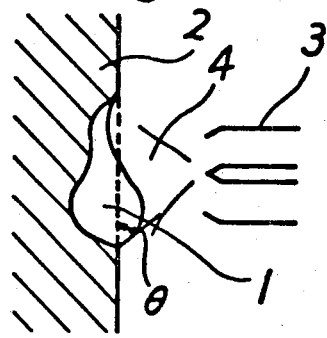
FIG. 1 is a view used for the explanation of the molten metal pool in the case of a vertical position welding.

In the case of the vertical downward welding position, since the arc is swung as described above, the surface of the base metal below the molten metal pool is preheated to high temperatures so that the contact angle $\theta$ (See FIG. 1) becomes small and consequently cold lap and lack of fusion can be avoided.

Figure 8:
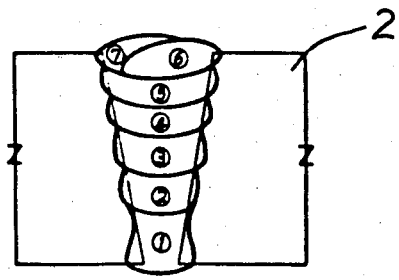
FIG. 8 shows a weld obtained with the welding process in accordance with the present invention.

Next some examples of the present invention will be described. Two pipes, 4,400 mm in diameter and made of a steel with a tensile strength of 60 kg/mm$^2$, were inclined at 45° and abutted against each other with a circumferential groove with narrow gap. The edges were joined by the one-side and all-position welding. The section of the weld is shown in FIG. 8. The welding was started from the bottom of the circumferential groove, and the welding position changed from flat through vertical upward to overhead. Semicircular edges were welded under the same conditions as shown in TABLE 1. Welding conditions in each pass remained unchanged regardless of the welding position. The electrode used was 4.0 mm in diameter and made of 2% Tn-W. The torch weaving was inclined at 40°. Argon shielding gas was supplied at the rate of 20 l/min. The temperature difference between the beads was maintained at 100° C.

the groove. Expecially the first "Uranami" or penetration bead is 8 mm in thickness. An intermediate bead completely covers the groove width of 16 mm.

In TABLE 2, the all-position TIG welding process in accordance with the present invention is compared with a most recently developed pule MIG welding process. In both processes, heat input was 33,000 Joule/cm.

TABLE 2

| Workpieces to be joined | Pipes 4,400 mm in diameter and 35 mm in wall thickness and made of HT 60. The axis of abutted pipes was inclined at 45°. | |
|---|---|---|
| Welding process | The Invention | Pulse MIG welding |
| Welding position | flat → vertical upward → overhead | Pulse MIG welding |
| Deposition rate | 45 g/min | 35 g/min |
| Weight of metal deposited per unit length | 5.6 g/cm | 4.4 g/cm |
| Heat input | 33,000 Joule/cm | 33,000 Joule/cm |
| Number of layers | 6 layers by 7 passes | 8 layers by 9 passes |

It is seen that the welding process of the present invention is by far superior not only in terms of the deposition rate but also the weight of metal deposited per unit length to the MIG welding processes. For instance, even in the case of the most difficult overhead welding position, the weight of metal deposited per unit length is 5.6 g/cm.

TABLE 3 shows the welding conditions when the

TABLE 1

| Layer (Pass No.) | Main current in Amperes | Sub-current in Amperes | Welding speed in cm/min | Deposition rate in g/min | Weight of deposited metal per unit length in g/cm |
|---|---|---|---|---|---|
| 1st layer (No. 1) | 420 | 150 | 9 | 40 | 4.4 |
| 2nd layer (No. 2) | 430 | 160 | 9 | 45 | 5.0 |
| 3rd layer (No. 3) | 430 | 160 | 8 | 45 | 5.6 |
| 4th layer (No. 4) | 420 | 160 | 8 | 45 | 5.6 |
| 5th layer (No. 5) | 420 | 160 | 8 | 40 | 5.0 |
| 6th layer (No. 6) | 300 | 160 | 10 | 30 | 3.0 |
| 6th layer (No. 7) | 300 | 160 | 10 | 30 | 3.0 |

From FIG. 8 and TABLE 1 it is seen that the pipes having a large wall thickness were joined with a minimum number of passes hitherto unattainable by any prior art all-position TIG welding processes. Except the 6th layer, each bead completely covers the full width of stainless steel pipes in 12 inches and 22 inches in diameter respectively were joined by the welding process of the present invention and the prior art welding processes in all position.

TABLE 3

| Workpieces to be joined Welding process | Pipes 12 inches in diameter and 22 mm in thickness, SUS 304 | | | Pipes 22 inches in diameter and 36 mm in thickness, SUS 304 | | |
|---|---|---|---|---|---|---|
| | Low-frequence pulse TIG | The invention | High-frequency pulse TIG | Low-frequency pulse TIG | The invention | High-frequency pulse TIG |
| Average welding current in Amperes and Hz | 150 A 1 ~ 2 Hz | 240 A 100 Hz | 250 A 20 kHz | 150 A 1 ~ 2 Hz | 240 A 100 Hz | 250 A 20 kHz |
| Filler wire | Cold | With the sub-current | Cold | Cold | With the sub-current | Cold |
| Average welding speed in cm/min | 10 | 10 | 10 | 10 | 10 | 10 |
| Maximum heat input in J/min | 8,000 | 14,000 | 15,000 | 8,000 | 14,000 | 15,000 |
| Number of passes | 45 | 15 | 25 | 81 | 32 | 45 |
| Arc time in hour | 7.4 | 2.5 | 4.2 | 22.2 | 8.8 | 12.5 |

TABLE 3-continued

| Workpieces to be joined | Pipes 12 inches in diameter and 22 mm in thickness, SUS 304 | | | Pipes 22 inches in diameter and 36 mm in thickness, SUS 304 | | |
| --- | --- | --- | --- | --- | --- | --- |
| Welding process | Low-frequence pulse TIG | The invention | High-frequency pulse TIG | Low-frequency pulse TIG | The invention | High-frequency pulse TIG |
| Maximum deposition rate in g/min | 8.0 | 24.0 | 15.0 | 8.0 | 24.0 | 15.0 |
| Critical deposition rate in g/cm | 0.8 | 2.4 | 1.5 | 0.8 | 2.4 | 1.5 |

From TABLE 3 above, it is readily seen that as compared with the prior art welding processes, the welding process in accordance with the present invention can considerably reduce the number of passes. As a result, when the loss time due to the intermittent interruption of welding for forming a new bead is taken into consideration, the overall efficiency is remarkably improved over the prior art welding processes.

TABLE 4 shows the welding condition when the bias current is superimposed on the sub-current and varied. In the weldings, welding current was 220 A; welding voltage, 9.5 V; welding speed, 10 cm/min; weaving speed, 120 to 130 cm/min; and weaving width, 4 to 8.5 mm.

TABLE 4

| Test No. | Direction of Horizontal welding | SP/RP ratio in sub-current $I_b$ | Deposition rate in g/cm | Critical deposition rate in g/cm | Result |
| --- | --- | --- | --- | --- | --- |
| No. 1 | upward | SP  RP  5/5  (no bias) | 20 | 2.0 | good |
|  | downward |  | 20 | 2.0 | good |
| No. 2 | upward | SP  RP  0/10 | 15 | 1.5 | fair |
|  | downward |  | 20 | 2.0 | good |
| No. 3 | upward | SP  RP  10/0 | 20 | 2.0 | good |
|  | downward |  | 16 | 1.6 | fair |
| No. 4 | upward | SP  RP  8/2 | 25 | 2.5 | excellent |
|  | downward |  | 18 | 1.8 | fair |
| No. 5 | upward | SP  RP  2/8 | 18 | 1.8 | fair |
|  | downward |  | 25 | 2.5 | excellent |

Note:
SP/RP ratio is the ratio between component of straight polarity (SP) and component of reverse polarity (RP) in the sub-current $I_b$.

In summary, according to the present invention, a large pool of molten metal can be maintained in a very satisfactory and stable manner in all welding positions and subsequently the welding efficiency such as weld deposition rate can be remarkably improved. Since the current pulses at intermediate frequencies are used, the inductance of the electric cable will not cause any adverse effects. For instance, even when the cable is extended over 100 meters, welding conditions remain unchanged so that the welding process in accordance with the present invention can be advantageously used in the field sites.

What is claimed is:

1. An all position TIG welding process which comprises during completion of a weld feeding DC current pulses of selected frequency to an electrode, feeding current pulses of the same frequency and of changing polarity to a filler wire and controlling the phase relationship between the electrode and filler wire pulses in a predetermined manner throughout formation of the weld to produce a controlled magnetic field whereby to cause the produced arc to swing under the influence of the field in predetermined amplitude and direction for each pass required to produce the weld.

2. An all position TIG welding process as claimed in claim 1 wherein during at least some of the passes required to complete the weld said electrode and filler wire pulses are locked in synchronous phase relationship.

3. An all position TIG welding process as claimed in claims 1 or 2 including superimposing a bias current on said filler wire current pulses so that without changing the amplitude of said swing the forward or backward swing thereof may be controlled.

4. An all position TIG welding process as claimed in claim 1 or 2 wherein the frequency of said pulses is within the range of 30 to 300 Hz.

5. An all position TIG welding process as claimed in claim 1 including superimposing a bias current on said filler wire current pulses so that without changing the amplitude of said swing the forward or backward swing thereof may be controlled and wherein the frequency of said pulses is within the range of 30 to 300 Hz.

* * * * *